July 29, 1930.  F. DE FRANCO  1,771,401
TIRE SPREADER
Filed June 16, 1928
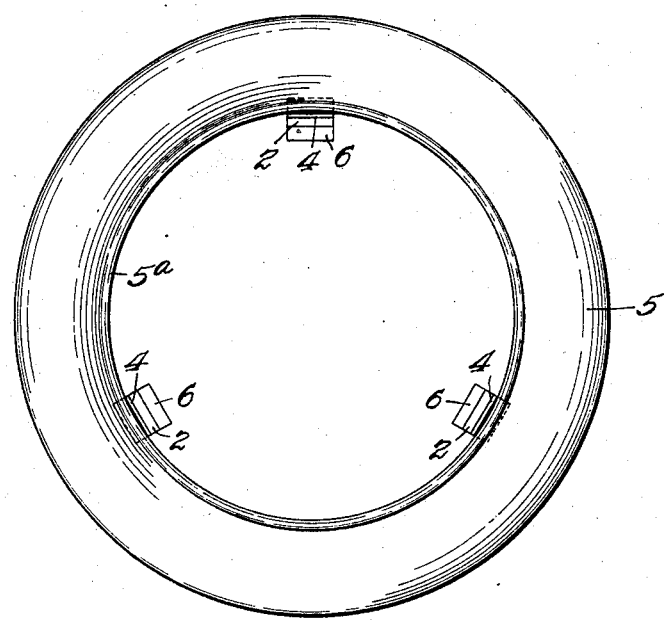
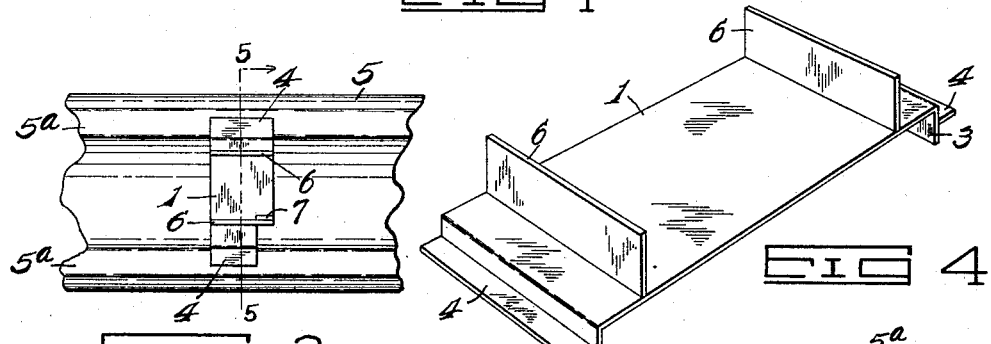
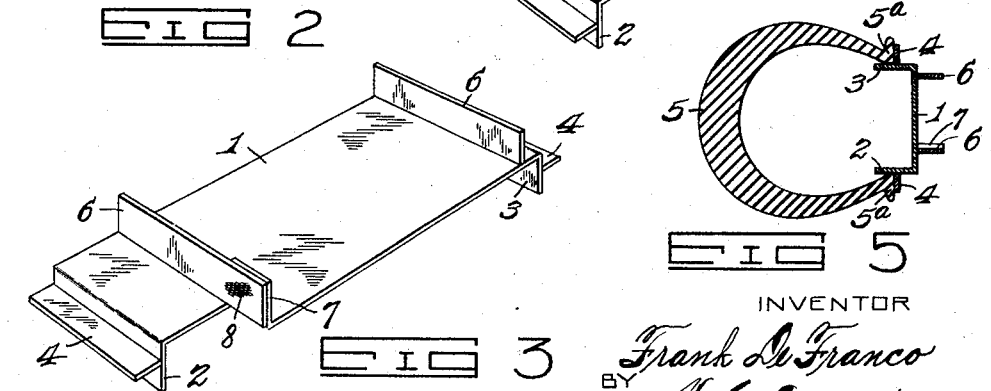
INVENTOR
Frank DeFranco
BY
N. E. Dunlap
ATTORNEY Patented July 29, 1930

1,771,401

UNITED STATES PATENT OFFICE

FRANK DE FRANCO, OF WEIRTON, WEST VIRGINIA, ASSIGNOR OF ONE-HALF TO GEORGE KARNOUPAKIS, OF WEIRTON, WEST VIRGINIA

TIRE SPREADER

Application filed June 16, 1928. Serial No. 285,996.

This invention relates broadly to tire spreaders, and it has for its primary object to provide a device by means of which the beads of a pneumatic tire casing may be held in separated, or spread, relation to facilitate the introduction and/or removal of the usual inflatable tube.

A further object is to provide a device of the character mentioned which shall be inexpensive to manufacture, durable and conveniently usable, and which shall occupy small space in the tool compartments of automobiles.

In describing the invention in detail, reference is herein had to the accompanying drawings, in which—

Figure 1 is a side elevation of a tire casing, showing a plurality of separate units embodying the invention applied thereto and illustrating the use of the invention;

Figure 2 is an enlarged inner face view of a fragmentary portion of a tire casing, showing the invention applied thereto;

Figure 3 is a perspective view of one form of the invention;

Figure 4 is a similar view of another, or modified, form of the invention; and—

Figure 5 is a section on line 5—5, Fig. 2.

Referring to said drawings, 1 designates the flat body portion of a heavy sheet metal plate which has its opposite ends turned downward at right angles to said body, forming end terminals 2 and 3.

Carried on the outer face of each of said terminals intermediate its bottom edge and the angle which it forms with the body 1, and occupying a plane substantially parallel to that of said body, is a transverse lip or lug 4 designed to seat upon a bead $5^a$ of a tire casing 5 when said plate has been inserted to a position wherein the terminals 2 and 3 abut said beads interiorly for maintaining the latter in separated relation. Said lips 4 may be rigidly mounted in place on said terminals in any appropriate manner, as by electric welding.

Mounted on the top face of the body 1 adjacent to each of its ends and disposed at right angles to the plane of said body is a transverse member 6. Said members 6 constitute parts affording a hand-hold or means whereby the tool may be grasped by hand to facilitate the application and removal thereof with respect to a tire casing. Said members 6 may be electrically welded or otherwise rigidly attached to the body 1.

In Fig. 4 of the drawings the opposite ends of the device are in all respects alike, while in Figs. 2 and 3 one end is of less width than the other and a lug 7 is struck up from a corner portion of the body 1 and occupies seated relation to a face of the adjacent member 6, being attached to the latter, as by spot welding, as shown at 8 in Fig. 3.

In practice, a plurality of the spreaders herein described are employed, the same being disposed at suitably spaced intervals about the inner periphery of the casing, as shown in Fig. 1. So disposed, the beads $5^a$ of the casing are maintained in spread relation, permitting a portion of a tube to be readily introduced between two adjacent spreaders, following which one of the latter is removed and introduction of the tube is continued. The spreaders are successively removed as they are successively reached in effecting introduction of the tube.

What is claimed is—

A spreader for tire casings composed of a sheet metal plate having its opposite ends extended outwardly at substantially right angles to the plane of the body to form terminals to engage the inner faces of the opposite tire casing beads, and lips secured to the outer faces of the terminals and extending longitudinally of said terminals and formed to engage the peripheral edges of the said tire casing beads to restrict inward movement of the terminals into the tire, said plate having a struck up-lug, and a pair of transverse members secured to the outer face of the plate and one of which is secured to said lug, said last named members being spaced to form a hand grip therebetween.

In testimony whereof, I affix my signature.

FRANK DE FRANCO.